(12) United States Patent
Yoshimura

(10) Patent No.: US 10,684,628 B2
(45) Date of Patent: Jun. 16, 2020

(54) FLIGHT RESTRICTION SETUP SYSTEM, FLIGHT RESTRICTION SETUP METHOD, AND FLIGHT RESTRICTION SETUP PROGRAM

(71) Applicant: SUBARU CORPORATION, Tokyo (JP)

(72) Inventor: Kensuke Yoshimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/246,045

(22) Filed: Jan. 11, 2019

(65) Prior Publication Data

US 2019/0204854 A1 Jul. 4, 2019

Related U.S. Application Data

(63) Continuation of application No. PCT/JP2017/016840, filed on Apr. 27, 2017.

(30) Foreign Application Priority Data

Sep. 28, 2016 (JP) .................................. 2016-190374

(51) Int. Cl.
 *G05D 1/00* (2006.01)
 *G05D 1/04* (2006.01)
 (Continued)

(52) U.S. Cl.
 CPC ............. *G05D 1/046* (2013.01); *B64D 45/00* (2013.01); *B64F 5/60* (2017.01)

(58) Field of Classification Search
 CPC ............ G05D 1/046; B64D 45/00; B64F 5/60
 (Continued)

(56) References Cited

U.S. PATENT DOCUMENTS 6,125,333 A * 9/2000 Pun ........................... B64F 5/60
 244/117 R
7,085,655 B2 * 8/2006 Ferrer ................... B64C 27/006
 702/35
(Continued)

FOREIGN PATENT DOCUMENTS

JP 06-336199 A 12/1994
JP 07-329893 A 12/1995
(Continued)

OTHER PUBLICATIONS

English Translation of the International Preliminary Report on Patentability in PCT/JP2017/16840, dated Apr. 11, 2019.
(Continued)

*Primary Examiner* — Khoi H Tran
*Assistant Examiner* — B M M Hannan
(74) *Attorney, Agent, or Firm* — McDermott Will & Emery LLP

(57) ABSTRACT

According to one implementation, a flight restriction setup system includes a damage detection unit and a flight restriction calculation unit. The damage detection unit detects a damage which arose in a structure composing an aircraft. The flight restriction calculation unit sets at least one flight restriction of the aircraft according to a degree of the damage detected by the damage detection unit. Further, according to one implementation, a flight restriction setup method includes: detecting a damage, which arose in a structure composing an aircraft, by a damage detection unit; and setting a flight restriction of the aircraft according to a degree of the damage detected by the damage detection unit.

7 Claims, 4 Drawing Sheets

(51) Int. Cl.
*B64F 5/60* (2017.01)
*B64D 45/00* (2006.01)

(58) Field of Classification Search
USPC .......................................................... 701/10
See application file for complete search history.

(56) References Cited

U.S. PATENT DOCUMENTS

| | | | | |
|---|---|---|---|---|
| 7,363,120 B2* | 4/2008 | Aubourg | ............... | B64C 27/008 244/17.11 |
| 8,897,932 B2 | 11/2014 | Komatsuzaki et al. | | |
| 2003/0004658 A1* | 1/2003 | Bechhoefer | ........... | B64C 27/001 702/56 |
| 2007/0034009 A1* | 2/2007 | Pado | ...................... | G01N 29/12 73/579 |
| 2009/0171634 A1* | 7/2009 | Bensch | ................. | G05B 13/04 703/2 |
| 2009/0292409 A1* | 11/2009 | Cordova | .................. | G07C 5/08 701/8 |
| 2009/0306909 A1* | 12/2009 | Mattes | ................ | G01M 5/0016 702/36 |
| 2010/0161244 A1* | 6/2010 | Ghoshal | ................. | G01N 29/14 702/35 |
| 2010/0219987 A1* | 9/2010 | Isom | .................... | G07C 5/0816 340/946 |
| 2011/0245999 A1* | 10/2011 | Kordonowy | ......... | G07C 5/0816 701/3 |
| 2013/0046459 A1* | 2/2013 | Itakura | .................. | B64D 45/04 701/301 |
| 2013/0211632 A1* | 8/2013 | Caule | ..................... | G05D 1/0061 701/3 |
| 2015/0204751 A1* | 7/2015 | Rands | ..................... | G01L 25/00 73/1.08 |
| 2016/0340058 A1* | 11/2016 | Da Silva | ................ | B64D 45/00 |
| 2017/0331844 A1* | 11/2017 | Harrigan | ............. | H04L 63/1425 |
| 2018/0170532 A1* | 6/2018 | Black | .................... | B64C 27/001 |

FOREIGN PATENT DOCUMENTS

| | | |
|---|---|---|
| JP | 10-167194 A | 6/1998 |
| JP | 2981562 B1 | 11/1999 |
| JP | 2000-146746 A | 5/2000 |
| JP | 2013-014152 A | 1/2013 |
| KR | 10-2013-0027729 A | 3/2013 |
| WO | 2011/155020 A1 | 12/2011 |
| WO | WO2015160945 * 10/2015 ........... B64C 27/001 |

OTHER PUBLICATIONS

International Search Report issued in corresponding International Patent Application No. PCT/JP2017/16840, dated Jul. 11, 2017, with English translation.
Japanese Office Action issued in corresponding Japanese Patent Application No. 2017-523546, dated Apr. 10, 2018, with English Translation.
Japanese Decision to Grant a Patent issued in corresponding Japanese Patent Application No. 2017-523546, Jun. 26, 2018, with English Translation.
Chinese Office Action issued in corresponding Chinese Patent Application No. 201780050068.2, dated Dec. 27, 2019, with English translation.
Extended European Search Report issued in corresponnding European Patent Application No. 17855239.4-1202, dated Feb. 18, 2020.
Chinese Office Action issued in corresponding Chinese Patent Application No. 201780050068.2, dated Apr. 8, 2020, with English translation.

* cited by examiner

FLIGHT RESTRICTION SETUP SYSTEM, FLIGHT RESTRICTION SETUP METHOD, AND FLIGHT RESTRICTION SETUP PROGRAM

CROSS REFERENCES TO RELATED APPLICATIONS

This is a continuation of Application PCT/JP2017/16840, filed on Apr. 27, 2017.

This application is based upon and claims the benefit of priority from Japanese Patent Application No. 2016-190374, filed on Sep. 28, 2016; the entire contents of which are incorporated herein by reference.

FIELD

Implementations described herein relate generally to a flight restriction setup system, a flight restriction setup method, and a flight restriction setup program.

BACKGROUND

In order to operate an aircraft safety, it is important to detect damage in a structure composing the aircraft so that flight conditions, such as an altitude, a speed, and a load factor, can be restricted when damage has been detected. For that purpose, a system for detecting damage which arose in a structure of an aircraft and changing control characteristic of the aircraft when damage has been detected is proposed (For example, refer to Japanese Patent Application Publication JP H6-336199). Moreover, a related art that a position and a degree of damage are discriminated when a control surface is damaged is also proposed (For example, refer to Japanese Patent Application Publication JP H10-167194).

An object of the present invention is to enable to set appropriate flight restrictions to an aircraft when damage arose in a structure of the aircraft.

SUMMARY OF THE INVENTION

In general, according to one implementation, a flight restriction setup system includes a damage detection unit and a flight restriction calculation unit. The damage detection unit detects a damage which arose in a structure composing an aircraft. The flight restriction calculation unit sets at least one flight restriction of the aircraft according to a degree of the damage detected by the damage detection unit.

Further, according to one implementation, a flight restriction setup method includes: detecting a damage, which arose in a structure composing an aircraft, by a damage detection unit; and setting a flight restriction of the aircraft according to a degree of the damage detected by the damage detection unit.

Further, according to one implementation, a flight restriction setup program has a computer execute: acquiring a damage, which arose in a structure composing an aircraft and detected by a damage detection unit, from the damage detection unit; and setting a flight restriction of the aircraft according to a degree of the damage acquired.

DETAILED DESCRIPTION

A flight restriction setup system, a flight restriction setup method, and a flight restriction setup program according to embodiments of the present invention will be described with reference to the accompanying drawings.

(First Implementation)
(Configuration and Function)

Figure 1:
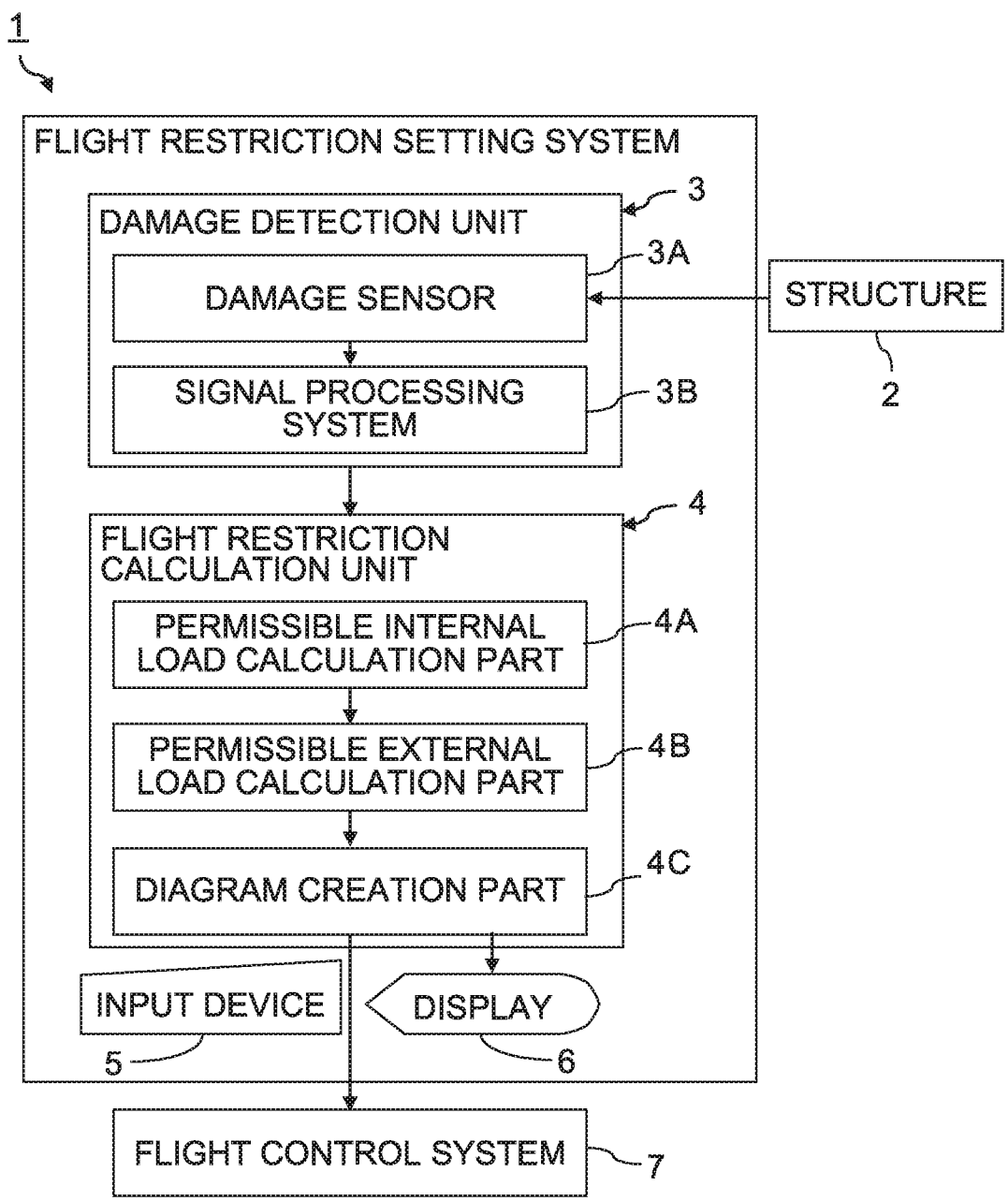
FIG. 1 is a configuration diagram of a flight restriction setup system according to an implementation of the present invention.

FIG. 1 is a configuration diagram of a flight restriction setup system according to an implementation of the present invention.

A flight restriction setup system 1 monitors whether damage arose in the structure 2 composing an aircraft and sets flight restrictions of the aircraft according to degree of damage when damage has been detected. The flight restriction setup system 1 has a damage detection unit 3, a flight restriction calculation unit 4, an input device 5, and a display 6. The input device 5 and the display 6 may be those provided with the aircraft.

The damage detection unit 3 monitors whether damage arose in the structure 2 composing the aircraft to detect damage arose in the structure 2. Moreover, the damage detection unit 3 is configured to detect an area or a position of damage and size of the damage in addition to existence of damage. Therefore, the damage detection unit 3 is composed of at least damage sensors 3A for detecting damage arose in the structure 2 and a signal processing system 3B for processing detection signals from the damage sensors 3A.

As for a method of damage detection, a desired method can be employed. For example, disposing strain sensors on the structure 2 as the damage sensors 3A to obtain a strain distribution arose in the structure 2 allows damage detection. In this case, threshold processing for a stain distribution can specify existence and a position of damage as a singular point. A singular point may be detected by targeting relative values to a strain amount at another position or targeting absolute values of strain amounts, using a threshold value determined experientially beforehand.

Alternatively, damage is also detectable by attaching at least one ultrasonic oscillator on the structure 2 to propagate an ultrasonic wave in the structure 2. In this case, a waveform of an ultrasonic wave corresponding to a case where there is no damage is compared with a waveform of an ultrasonic wave after damage arose, and it can be determined that damage arose when a variation of the waveform of the ultrasonic wave is not less than or more than a threshold value determined experientially beforehand.

Moreover, also as for a method of detecting a damaged position using an ultrasonic wave, a desired method is employable. As a concrete example, ultrasonic sensors can be disposed on the structure 2 as the damage sensors 3A so that a damaged position can be identified as a singular point, at which variation of waveform is large, based on a distribution of ultrasonic waveforms detected by the ultrasonic sensors. As another concrete example, when damage has been detected, the damaged position may be identified by a detailed damage inspection using a reflected wave of an ultrasonic wave. Specifically, a distance from an ultrasonic oscillator to the damage or a distance from the damage to an ultrasonic sensor can be measured based on receiving timing of a reflective wave of ultrasonic wave which has been reflected on the damage.

As each damage sensor 3A which composes the damage detection unit 3A, an appropriate sensor corresponding to physical quantity used for detection of damage is selected. For example, when ultrasonic waves are used for detection of damage, ultrasonic transducers or optical fiber sensors are included in the damage detection unit 3 as the damage sensors 3A. Alternatively, when strain amounts are detected, optical fiber sensors or the like are included in the damage detection unit 3 as strain sensors.

Typical optical fiber sensors include an FBG (fiber Bragg grating) sensor and a PS-FBG (phase-shifted FBG) sensor. When at least one optical fiber sensor is used as the damage sensor 3A, optical elements, such as a light source and an optical filter, and a photoelectric conversion circuit are also included in the damage detection unit 3. In addition, an optical element for signal processing for an optical signal may be prepared in the damage detection unit 3.

On the other hand, the signal processing system 3B which composes the damage detection unit 3 can be composed of circuitry. As a practical example, the signal processing system 3B can be composed of a computer, which has read program, and an A/D (analog-to-digital) converter which converts detection signals of physical quantities, output as analog electric signals from the damage sensors 3A, such as ultrasonic transducers, or a photoelectric conversion circuit connected to output sides of optical fiber sensors, into digital electric signals.

When signal processing, such as filter processing and averaging processing, for noise rejection or the like is performed to an electric signal, circuits necessary for the signal processing may be connected in a case that the signal processing is performed to an analog signal while the computer may read signal processing program so that the computer can have signal processing functions in a case that the signal processing is performed to a digital signal.

The flight restriction calculation unit 4 can also be composed of circuitry, such as a computer which has read program. Therefore, the flight restriction calculation unit 4 may be unified with the signal processing system 3B of the damage detection unit 3. Moreover, flight restriction setup program for a computer to function as the flight restriction calculation unit 4 may be recorded on an information recording medium so that the information recording medium can be circulated as a program product.

The flight restriction calculation unit 4 has function to automatically set at least one flight restriction of an aircraft according to degree of damage detected by the damage detection unit 3. For that purpose, the flight restriction calculation unit 4 has a permissible internal load calculation part 4A, a permissible external load calculation part 4B, and a diagram creation part 4C.

The permissible internal load calculation part 4A has function to calculate a permissible range of internal load, which can be applied on each member composing the structure 2 after generation of damage detected by the damage detection unit 3, based on a position and a size of the damage.

The permissible range of internal load can be calculated by an FEM (finite element method) analysis. More specifically, a permissible value for mechanical strength of a damaged member is updated from a permissible value for the mechanical strength, set as a default before being damaged, to a permissible value for the mechanical strength according to a size of the damage. Then, a distribution of the permissible values for the mechanical strengths of respective members is input as input data for the FEM analysis and the distribution of the permissible values for internal loads of the members is output as a result of the FEM analysis.

The permissible values for the mechanical strengths required for the respective members composing the structure 2 of the aircraft are calculated based on internal loads, which may be applied on the members composing the structure 2, at the time of designing the members composing the structure 2. Therefore, the calculation of the permissible ranges for the internal loads which can be respectively applied on the members composing the structure 2 is an inverse calculation to the calculation of the permissible ranges for the mechanical strengths at the time of designing.

The permissible external load calculation part 4B has function to calculate a permissive range for external load which can be applied on the structure 2 after damage arose, based on a permissive range for internal load which can be applied on each member composing the structure 2. Examples of the permissive range for external load include at least one of permissive ranges for a distribution of shear forces, a distribution of bending moments and a distribution of torques.

The permissive range for internal load required for each member composing the structure 2 of the aircraft is calculated based on an external load, which may be applied on the whole structure 2, at the time of designing each member composing the structure 2. Therefore, the calculation of the permissible range of external load which can be applied on the structure 2 after damage arose is an inverse calculation to the calculation for the permissive range of internal load required for each member at the time of designing.

Figure 2A:
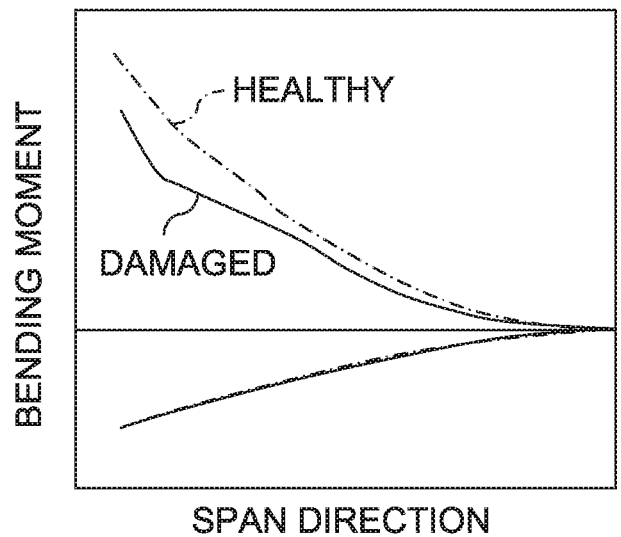
FIGS. 2A and 2B show graphs each showing an example of permissible range of the bending moment of a main wing in the span direction.
Figure 2B:
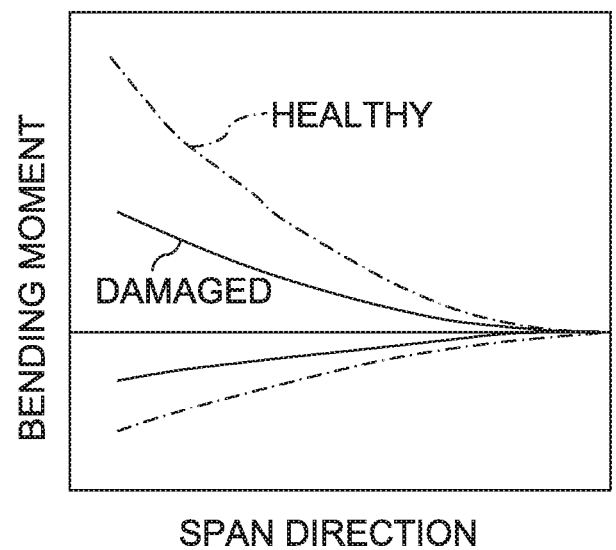

FIGS. 2A and 2B show graphs each showing an example of permissible range of the bending moment of a main wing in the span direction.

In FIG. 2 (A) and FIG. 2 (B), each vertical axis shows bending moments of a main wing while each horizontal axis shows a span direction of the main wing. FIG. 2 (A) shows permissible ranges of bending moments of the main wing, before and after modification, which are obtained by changing only a permissible internal load of a member in which damage arose. Meanwhile, FIG. 2 (B) shows permissible ranges of bending moments of the main wing before and after modification in a case of reducing the permissible range of bending moment of the whole main wing with the same reduction rate as a strength reduction rate of the member on which the damage arose. Moreover, in FIG. 2 (A) and FIG. 2 (B), each dashed-dotted line shows the permissible value of bending moment in a healthy state before the damage arose while each solid line shows the permissible value of bending moment after the damage arose.

When the permissible range of bending moment of the whole main wing is reduced with the same reduction rate as a strength reduction rate of the member in which the damage arose, as shown in FIG. 2 (B), the permissible range of bending moment is deteriorated excessively although strength can be borne by healthy members. On the contrary, when only the permissible internal load of the structure member influenced by the damage is changed to update the permissible range of bending moment of the main wing, a degradation amount in permissible range of bending moment from the healthy state to a damaged state can be reduced as shown in FIG. 2 (A).

The diagram creation part 4C has function to calculate a maneuvering envelope (V-n diagram), showing a relation between limit load factors of the aircraft after the damage arose and a permissible range of flight airspeed, based on the permissible range of external load calculated by the permissible external load calculation part 4B, and set a flight restriction of the aircraft for at least a flight airspeed, based on the maneuvering envelope. The V-n diagram can be calculated for every altitude of the aircraft. In that case, a flight restriction can also be set for the altitude.

Note that, a load factor is a value derived by dividing an aerodynamic force, which an aircraft receives during flight, by a body weight, and an index showing how many times the aerodynamic force which the aircraft receives during flight is as large as the weight of the aircraft. Meanwhile, a V-n diagram shows a relation between flight airspeeds V and limit load factors n which are the maximum load factors.

The permissible range of external load required for the structure 2 of the aircraft is calculated based on the V-n diagram at the time of designing of the structure 2. Therefore, the calculation of the V-n diagram after damage arose is an inverse calculation of the calculation for the permissible range of external load required for the structure 2 at the time of designing.

Figure 3A:
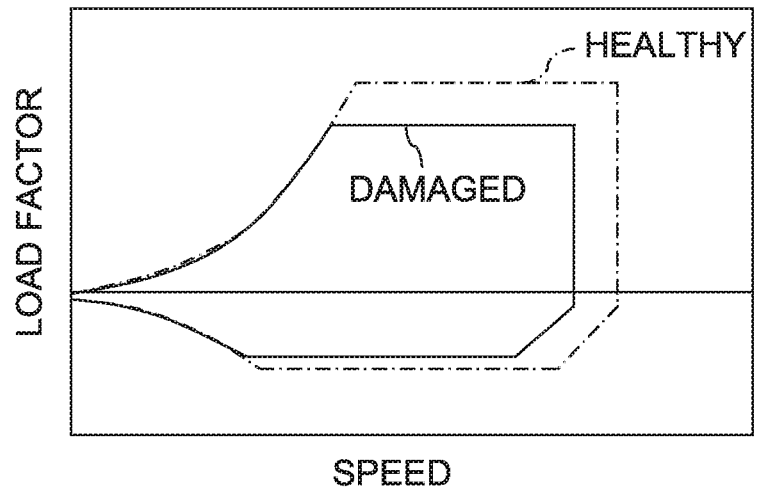
FIGS. 3A and 3B show graphs each showing an example of maneuvering envelope.
Figure 3B:
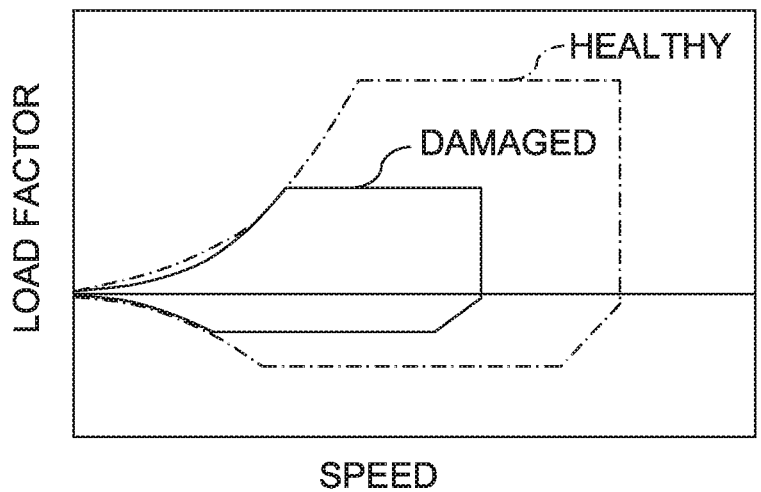

FIGS. 3A and 3B show graphs each showing an example of maneuvering envelope.

In FIG. 3 (A) and FIG. 3 (B), each vertical axis shows limit load factors n of the aircraft while each horizontal axis shows flight airspeeds V of the aircraft. FIG. 3 (A) shows V-n diagrams before and after modification, obtained by changing only a permissible internal load of a member in which damage arose. Meanwhile, FIG. 3 (B) shows V-n diagrams before and after modification, obtained based on a permissible external load of the whole main wing reduced with the same reduction rate as a strength reduction rate of the member in which the damage arose. Moreover, in FIG. 3 (A) and FIG. 3 (B), each dashed-dotted line shows the V-n diagram in the healthy state before the damage arises while each solid line shows the V-n diagram after the damage arose.

When the permissible external load of the whole main wing is reduced with the same reduction rate as the strength reduction rate of the member in which the damage arose to obtain the V-n diagram as shown in FIG. 3 (B), an unnecessarily limited flight restriction which is set. On the contrary, when only the permissible internal load of the member in which the damage arose is changed so that the permissible external load is reduced to obtain the V-n diagram, it becomes possible to set an appropriate flight restriction which can compensate strength reduction of the member due to the damage, as shown in FIG. 3 (A).

When a V-n diagram is obtained as information for flight restrictions of the aircraft, the flight restrictions of the aircraft can be performed based on the V-n diagram. That is, at least one flight restriction set before the damage arises can be updated to a flight restriction in consideration of the damage.

The methods of updating a flight restriction include a method of automatically updating the flight restriction and a method of manually updating the flight restriction by a pilot. Accordingly, the diagram creation part 4C has function to automatically update a flight restriction of the aircraft by controlling the flight control system 7 and function to display flight restriction information on the display 6.

Accordingly, when each flight restriction is updated automatically in a case that damage has been detected, each flight restrictions can be updated automatically by the automatic control of the flight control system 7. Specifically, flight conditions, such as an altitude, a speed and a load factor, of the aircraft are respectively controlled to become within flight restrictions defined by V-n diagrams. On the other hand, when each flight restriction is manually updated with a pilot in a case that damage has been detected, the pilot can determine flight conditions such as an altitude, a speed, and a load factor, of the aircraft with reference to V-n diagrams displayed on the display 6 or flight conditions obtained based on the V-n diagrams.

(Operation and Action)

Next, a method for setting flight restrictions of an aircraft by the flight restriction setup system 1 will be described.

Figure 4:
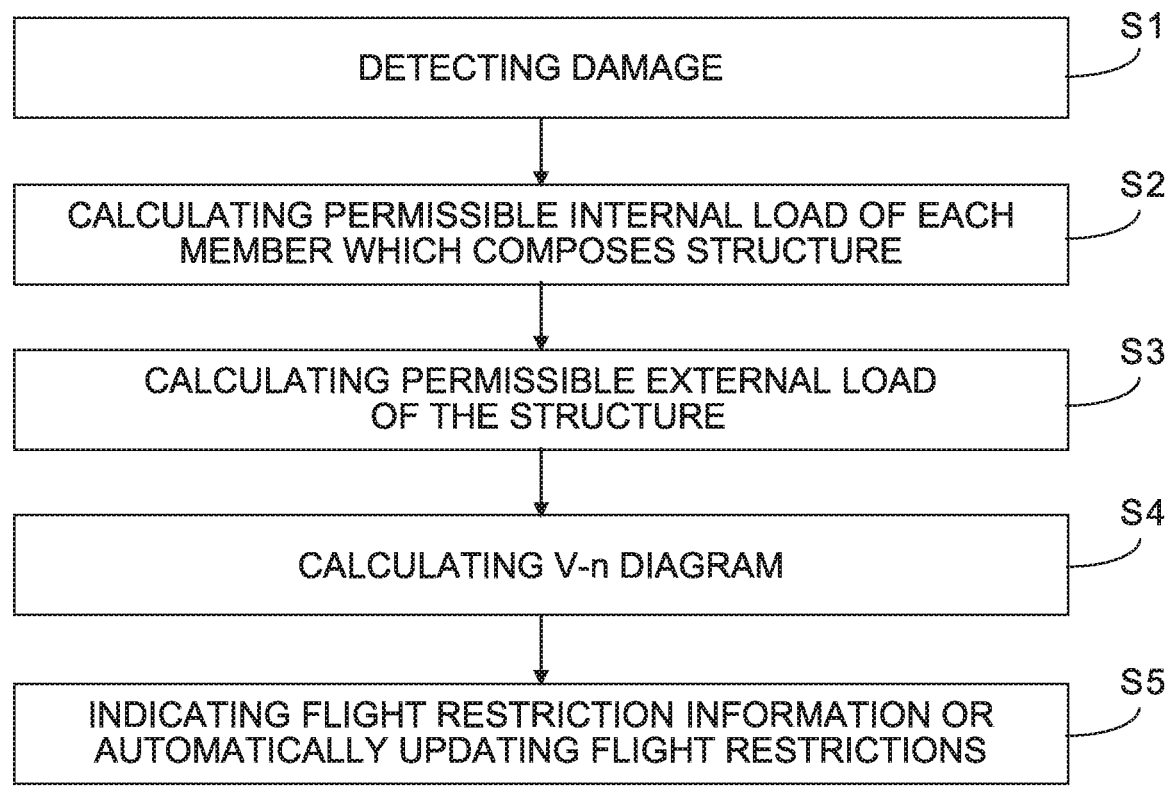
FIG. 4 is a flow chart which shows an example of operation of the flight restriction setup system shown in FIG. 1.

FIG. 4 is a flow chart which shows an example of operation of the flight restriction setup system 1 shown in FIG. 1.

Firstly, in step S1, when damage arises in the structure 2 which composes the aircraft, the damage is detected by the damage detection unit 3. The damage detection information including a position of the damage and an index showing a degree of the damage, such as a size of the damage, which is detected by the damage detection unit 3 is output from the damage detection unit 3 to the flight restriction calculation unit 4. That is, the flight restriction calculation unit 4 acquires the detection information of the damage detected by the damage detection unit 3.

Next, in step S2, the permissible internal load calculation part 4A calculates a permissible internal load of each member influenced by the damage, out of respective members composing the structure 2, based on the position of the damage and the degree of the damage. That is, the permissible internal load of each member which changed due to the damage on the structurer2 is calculated.

Next, in step S3, the permissible external load calculation part 4B calculates the permissible external load which the whole structure 2 can bear, based on the permissible internal loads which the structure members composing the structure 2 can bear. As a concrete example, when the structure 2 is a man wing, a permissible value for a shear force distribution, a permissible value for a bending moment distribution, and a permissible value for a torque distribution, in the span direction of the main wing are calculated.

Next, in step S4, the diagram creation part 4C calculates a V-n diagram corresponding to each altitude, based on the permissible external load which the structure 2 can bear. That is, V-n diagrams showing ranges of flight conditions which can be set in a state that the structure 2 has received the damage are calculated.

Next, in step S5, the diagram creation part 4C sets flight restrictions of the aircraft according to the degree of the damage and provides the set flight conditions. For example, the diagram creation part 4C displays a flyable altitude, a flyable speed, and a flyable limited load factor, which are obtained based on the calculated V-n diagrams corresponding to respective altitudes, on the display 6. Thereby, a pilot of the aircraft can fly the aircraft under the flight restrictions which have been newly set in consideration of the damage in the structure 2.

Alternatively, the diagram creation part 4C can automatically control the flight control system 7 so that the aircraft may fly under the flight restrictions based on the calculated V-n diagrams corresponding to respective altitudes. That is, the altitude, the speed, and the limited load factor can be automatically locked so as not to exceed the permissible values respectively. Thereby, the aircraft can fly safely even after the structure 2 received the damage.

(Effects)

As described above, the flight restriction setup system 1 and the flight restriction setup method can set optimal flight conditions according to a degree of damage when the structure 2 of the aircraft receives the damage and strength partially deteriorates.

Conventionally, when the structure 2 has been damaged and strength of a certain structure member has decreased by 50%, for example, a pilot has applied flight restrictions for flight so that the external load applied on the whole structure 2 might be 50%. Specifically, when strength of a part of the structure 2 was deteriorated due to damage, the external load of the whole structure 2 was conventionally restricted with the same ratio as a reduction rate in strength of the part, as a rule on operation. However, when a uniform flight restriction is set according to a strength reduction of a damaged structure member, an excessive flight restriction is to be set although structure members have a margin in strength.

On the contrary, the flight restriction setup system 1 and the flight restriction setup method calculates a permissible internal load distribution according to a strength reduction of a damaged structure member, and subsequently, the permissible external load distribution is calculated based on the obtained permissible internal load distribution. That is, the permissible external load of the whole structure 2 is recalculated based on a strength of a structure member which has been lowered locally in response to the damage and strengths of most of the structure members which have not received the damage. Then, V-n diagrams are calculated based on the recalculated permissible external load.

Therefore, according to the flight restriction setup system 1 and the flight restriction setup method, even when the structure 2 has been damaged by collision of a bullet, a thunder, collision of a bird or the like during flight of an aircraft, flight restrictions, such as an altitude, a speed, and a load factor, appropriate to a degree of the damage can be set. For example, when a strength required for a damaged structure member is required only in a specific flight state, flight restrictions can be set so that an external load may be reduced only in the specific flight state. Then, the aircraft can land back safely without expanding the damage.

Moreover, even when a strength margin of a structure member becomes insufficient due to damage in the structure 2, flight conditions necessary in order to secure the strength margin of the structure member can be grasped so that the flight conditions can be changed promptly.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A flight restriction setup system comprising;
    a damage detection unit, including at least one damage sensor, that detects a damage which arose in a structure composing an aircraft; and
    a flight restriction calculation circuit that calculates a permissible range of an internal load, which can apply on each member composing the structure after the damage arose, based on a position and a size of the damage detected by the damage detection unit, and sets at least one flight restriction of the aircraft according to a degree of the damage detected by the damage detection unit, the at least one flight restriction being set based on the calculated permissible range of the internal load,
    wherein the flight restriction calculation circuit calculates the permissible range of the internal load of the each member composing the structure by changing only the permissible range of the internal load of the each member in which the damage arose, and
    wherein the flight restriction calculation circuit is adapted to calculate maneuvering envelopes corresponding to altitudes of the aircraft, and further set a flight restriction to an altitude of the aircraft, based on the calculated maneuvering envelopes corresponding to the altitudes of the aircraft.

2. The flight restriction setup system according to claim 1, wherein the flight restriction calculation circuit is adapted to calculate a permissible range of an external load, which can apply on the structure after the damage arose, based on the permissible range of the internal load, and set the at least one flight restriction based on the calculated permissible range of the external load.

3. The flight restriction setup system according to claim 2, wherein the flight restriction calculation circuit is adapted to calculate a permissible range of at least one of a distribution of shearing forces, a distribution of bending moments and a distribution of torques, as the permissible range of the external load.

4. The flight restriction setup system according to claim 3, wherein the flight restriction calculation circuit is adapted to calculate at least one of the maneuvering envelopes, representing a relation between limit load factors of the aircraft after the damage arose and a permissible range of an airspeed, based on the permissible range of the external load, and set a flight restriction to at least the airspeed, based on the calculated at least one maneuvering envelope.

5. The flight restriction setup system according to claim 2, wherein the flight restriction calculation circuit is adapted to calculate at least one of the maneuvering envelopes, representing a relation between limit load factors of the aircraft after the damage arose and a permissible range of an airspeed, based on the permissible range of the external load, and set a flight restriction to at least the airspeed, based on the calculated at least one maneuvering envelope.

6. A flight restriction setup method comprising:
    detecting a damage, which arose in a structure composing an aircraft, by a damage detection unit including at least one damage sensor; and
    calculating a permissible range of an internal load, which can apply on each member composing the structure after the damage arose, based on a position and a size of the damage detected by the damage detection unit by changing only the permissible range of the internal load of the each member in which the damage arose; and
    setting a flight restriction of the aircraft according to a degree of the damage detected by the damage detection unit, the at least one flight restriction being set based on the calculated permissible range of the internal load;
    calculating maneuvering envelopes corresponding to altitudes of the aircraft: and further setting a flight restriction to an altitude of the aircraft, based on the calculated maneuvering envelopes corresponding to the altitudes of the aircraft.

7. A non-transitory medium storing a program product composed of a medium storing a flight restriction setup program having a computer execute:
acquiring a damage, which arose in a structure composing an aircraft and detected by a damage detection unit including at least one damage sensor, from the damage detection unit;
calculating a permissible range of an internal load, which can apply on each member composing the structure after the damage arose, based on a position and a size of the damage detected by the damage detection unit by changing only the permissible range of the internal load of the each member in which the damage arose;
setting a flight restriction of the aircraft according to a degree of the damage acquired, the at least one flight restriction being set based on the calculated permissible range of the internal load;
calculating maneuvering envelopes corresponding to altitudes of the aircraft; and further setting a flight restriction to an altitude of the aircraft, based on the calculated maneuvering envelopes corresponding to the altitudes of the aircraft.

* * * * *